United States Patent [19]
Deese

[11] Patent Number: 5,919,110
[45] Date of Patent: Jul. 6, 1999

[54] GEARED CAM LOCKING DIFFERENTIAL

[76] Inventor: Ronnie W. Deese, 379 E. T. Poole Rd., Poplarville, Miss. 39470

[21] Appl. No.: 08/924,094

[22] Filed: Sep. 5, 1997

[51] Int. Cl.[6] .............................. F16H 48/06; F16H 48/20
[52] U.S. Cl. ........................... 475/231; 475/236; 475/240
[58] Field of Search ..................................... 475/230, 231, 475/236, 240, 249, 251, 252, 223, 226, 227, 242, 220

[56] References Cited

U.S. PATENT DOCUMENTS

| | | | |
|---|---|---|---|
| 1,273,957 | 7/1918 | Ungar | 475/226 |
| 1,401,204 | 12/1921 | Storey | 475/226 X |
| 1,775,312 | 9/1930 | Heap | 475/231 X |
| 2,342,755 | 2/1944 | Randall | 475/226 |
| 2,462,000 | 2/1949 | Randall | 475/227 |
| 2,495,016 | 1/1950 | Mesick | 475/231 X |
| 2,630,024 | 3/1953 | Pontrello | 475/226 |
| 2,631,475 | 3/1953 | Gleasman | 475/227 |
| 2,666,343 | 1/1954 | Casa-Massa | 475/227 |
| 2,775,142 | 12/1956 | Brensike et al. | 475/251 X |
| 2,898,779 | 8/1959 | Mickelson | 475/227 |
| 3,237,483 | 3/1966 | Kelley et al. | 475/251 X |
| 3,899,939 | 8/1975 | Hilado | 475/226 |
| 4,762,022 | 8/1988 | Johnshoy | 475/249 X |
| 5,071,395 | 12/1991 | Fahy et al. | 475/226 |
| 5,098,360 | 3/1992 | Hirota | 475/240 X |
| 5,601,508 | 2/1997 | Kuzevanov | 475/231 |

*Primary Examiner*—Charles A. Marmor
*Assistant Examiner*—Scott Luno
*Attorney, Agent, or Firm*—Reginald F. Roberts, Jr.

[57] ABSTRACT

An automatic self-locking differential wherein the improvement is made by the independent function provided by a geared integral locking mechanism. This independent function allows in a vertical manner for the relative resistive axial motion of either of two axial moving pinion shafts to occur in an intermittent fashion. Drive axles are mounted with bevel gears within a rotating differential casing. The bevel gears mesh with pinion gear sets which are mounted on shafts.

6 Claims, 5 Drawing Sheets

GEARED CAM LOCKING DIFFERENTIAL

BACKGROUND OF THE INVENTION

There are two classifications of differentials. The first and most widely used is the conventional differential. The second classification is the non-conventional differential. Each classification functions with varying degrees of efficiency. There are two functions performed by every differential. They are as follows;

I. Torque Application—Ability to convert energy received into rotational motion to one or more axles.

II. Maneuverability—Ability to differentiate between opposing axles due to variance in wheel speeds.

In the past non-conventional differentials have excelled over conventional differentials in torque application, but the conventional differential has excelled in the area of maneuverability. Listed below is a contrast between the two classifications of differentials and their varying degrees of efficiency.

I. Torque Application
  A. Conventional Differential
    1. Applies torque to the "least" resistive wheel.
      a. Probability of immobility is greatest with this type.
  B. Non-conventional Differentials (Two Types)
    1. Limited Slip Differentials
      a. This unit "transfers" torque to the most resistive wheel.
    1. Probability of immobility is less than with a conventional differential.
    2. Locking Type Differentials
      a. This unit delivers torque to all driveable wheels simultaneously.
    1. Probability of immobility is the least with this type.
II. Maneuverability
  A. Conventional Differentials
    1. Allows for "rapid spin up" of one wheel resulting in either or both of;
      a. Broken axle.
      b. Excessive tire wear upon recontact of tire on road.
  B. Non-conventional Differentials
    1. Some non-conventional differentials operate "harsher" than others. The harsher the operation, the more noticeable are the below mentioned problems;
      a. Excessive tire wear due to harsh operation when maneuvering.
      b. Pinching or binding action occurring when maneuvering.
      c. Understeer when cornering under power.
      d. Fishtailing during inclement weather conditions (especially noticeable when incline and vehicle weight play a role).

It matters not whether a differential is of a conventional or non-conventional type, if it gears multiple axles together, then each axle is dependent upon the opposite axle. This is known as a "transferring" of speed and/or power. Whatever action occurs to one axle, causes the opposite axle to react. This has led to tragic results that is referred to as "rapid spin up".

When a differential is driven in a straight line with no variance, both axles revolve 100% at equal speeds. If a variance of 10% occurs, then the slower axle will rotate at 90% of the previous speed, while the faster turning axle will rotate at 110% of the previous speed. On a non-conventional differential this action can result in a pinching or binding action that causes "understeer" to occur. On a conventional differential if one axle becomes immobilized, then the opposite axle will increase 100% in excess of normal operating speed as the same r.p.m.'s are delivered.

In consideration of the two differentiating functions of torque application and maneuverability, it is apparent that no matter how much torque application one may attain, if safety in maneuverability declines, then a dangerous condition exists.

SUMMARY OF THE INVENTION

In general, the present invention provides an automatic self-locking differential wherein the improvement is made by the independent function provided by a geared integral locking mechanism. This independent function allows in a vertical manner for the relative resistive axial motion of either of axial moving pinion shafts to occur in an intermittent fashion. When either pinion shaft is propelled axially, the axle to which it is geared becomes unlocked and "free-wheels". The opposite axle becomes locked due to a set of gear cam locks. These gear cam locks have gear teeth cut on their periphery, and a notch cut in each of them. This allows for a camming and locking action to occur as these gear cam locks are mounted adjacent to one another. This action causes an intermittent result to occur, by locking either axle in place with 100% power applied unto it; a simultaneous camming action allows the opposite axle to freewheel.

DETAILED DESCRIPTION OF THE INVENTION

In regard to the problems incurred by the prior art dealing with torque application and maneuverability, the objects and advantages of my differential addresses this problem with its focus upon safety in maneuverability and ease of operation. They are as follows;

I. Torque Application
  A. When driven in forward motion with the heads of the axial moving pinion shafts abruptly against the differential casing, 100% continuous power is provided to all driveable axles in a simultaneous manner.
    1. Probability of immobility is the least with this type differential.
II. Maneuverability
  A. Eliminates "rapid spin up" of one wheel.
  B. Eliminates "harsh operation".

C. Maneuverability;
1. Ease of performance; This feature makes it desirable for intermittent use in on and off road applications while providing a safe mode of operation. Its safety in maneuverability is noticeable in two specific areas;
   a. Inclement weather conditions.
   b. Those of lesser experience in non-conventional driving.
2. Automatic in operation to allow for an automatic self-locking differential which may engage or disengage as needed so as to allow for variance in axle speeds.
3. Independent in function so as to allow one axle to unlock or "freewheel" during maneuvering without hindering the smooth operation of the opposite axle.

D. Torque Application
1. Able to automatically deliver 100% continuous power to all driveable axles in a simultaneous manner.

In consideration of the two differentiating functions of torque application and maneuverability, it is apparent that my discussed differential does not sacrifice in one function so as to gain in another. Further objects and advantages of my differential will become apparent from a consideration of the drawings and ensuing description/operation section of my specification.

In a first aspect, my invention provides an improved automatic self-locking differential wherein the improvement is made by the independent function provided by a geared integral locking mechanism. This independent function allows in a vertical manner for the relative resistive axial motion of either of axial moving pinion shafts 60R and 60L to occur in an intermittent fashion.

Figure 2:
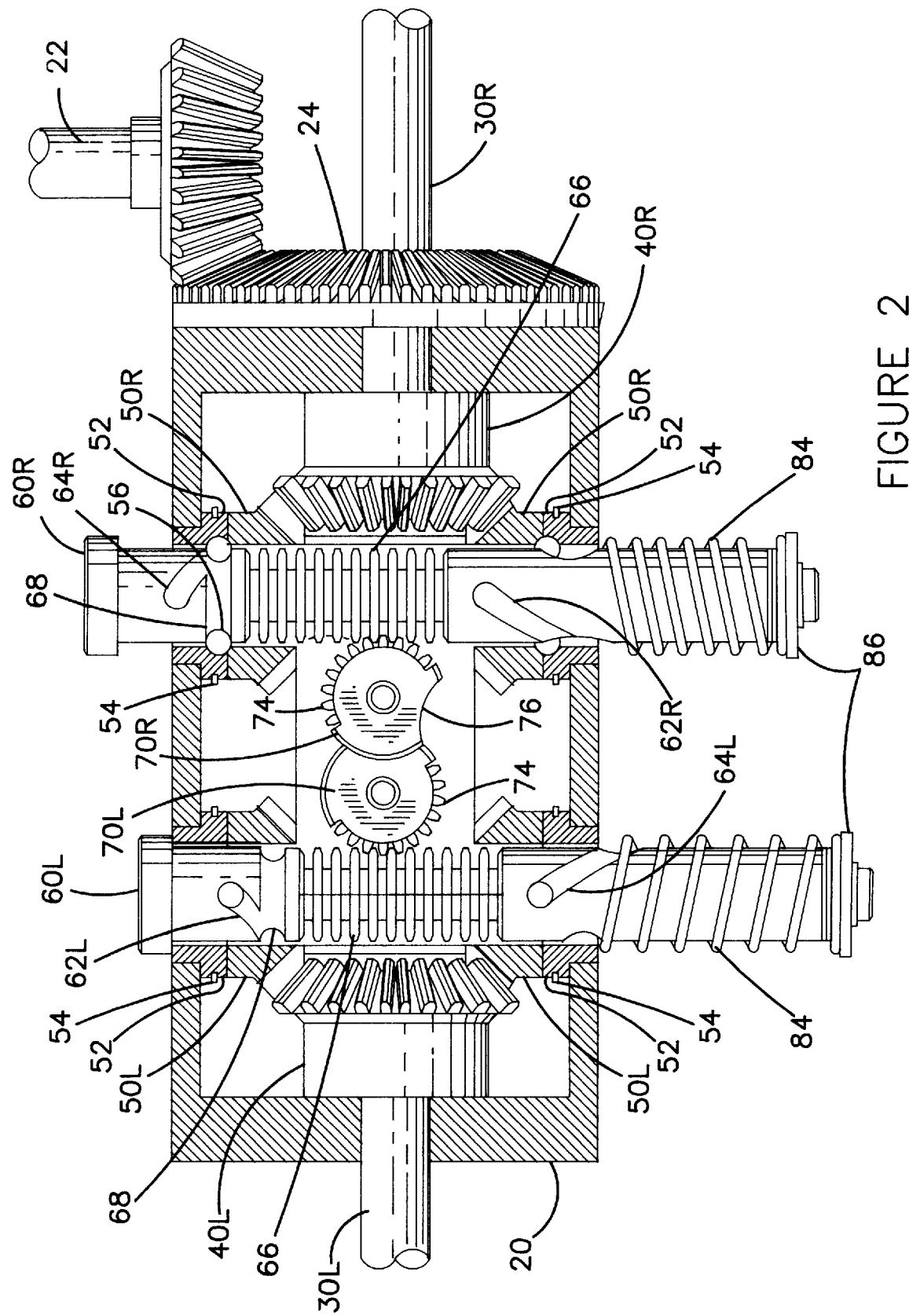
FIG. 2 is a perspective view of the geared cam locking differential system shown in FIG. 1, showing an external housing for the system.

As illustrated in FIG. 2, we see that pinion gear 22 meshes with ring gear 24 which is mounted on differential casing 20. Drive axles 30R and 30L are each mounted with a bevel gear 40R and 40L which are held in place by C-clips 58. Each bevel gear 40R and 40L has meshing pinion gear sets 50R and 50L which are mounted on pinion shafts 60R and 60L. Shafts 60R and 60L have opposing helixes 62R&L and 64R&L cut into each shaft. The numeral 62 signifies a right handed helix, while the numeral 64 signifies a left handed helix. The suffix R&L signifies right or left shaft. Shafts 60R and 60L also have gear teeth 66 and continuous grooves 68 cut in them. Please note that continuous grooves 68 may be placed in the top helix of shafts 60R and 60L as shown in FIG. 2, or in the bottom helix of shafts 60R and 60L (not shown).

Figure 1:
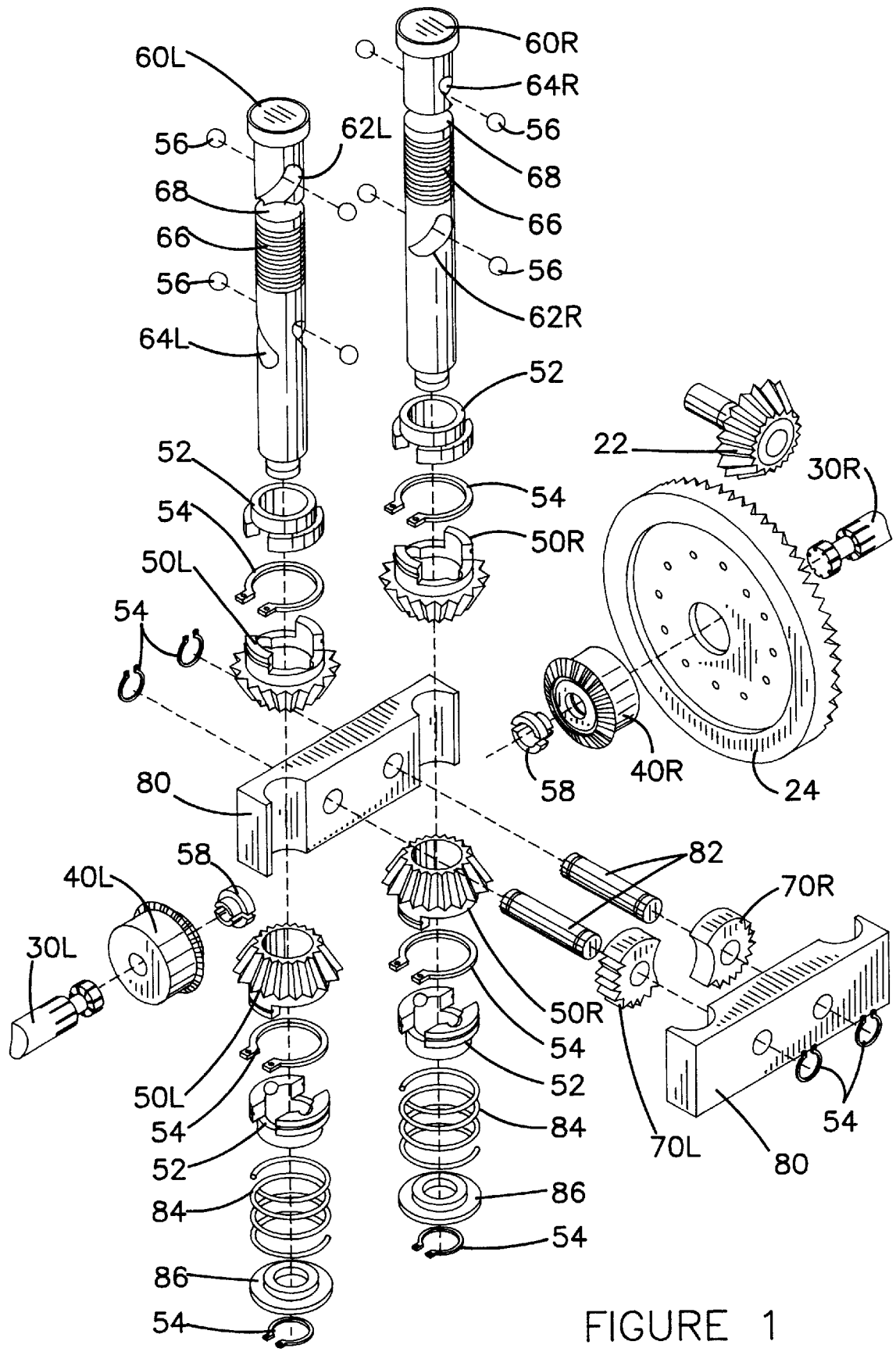
FIG. 1 is an exploded view of a first embodiment of a geared cam locking differential system, made in accordance with the principles of the present invention.

As illustrated in FIG. 1, an exploded view of pinion gear sets 5OR and 50L, is shown. Between each gear 5OR and 50L and its split hub 52, are placed multiple balls or elongated pins known as driveable objects 56. This assembly is then held together by snap rings 54.

As illustrated in FIG. 2, a perspective view of a geared integral locking unit is shown. This detailed view shows the unit to be comprised of concave shaped gear cam locks 70R and 70L. Cut in locks 70R and 70L are gear teeth 74 and notches 76.

As illustrated in FIG. 1, we see gear cam locks 70R and 70L are placed within split block 80. This assembly is then held together by retaining shafts 82, as compression springs 84 holds tension against retaining plates 86.

During maneuvering a differential must be allowed to differentiate because of the varying wheel speeds. This describes the unique differentiating function of an automatic self-locking differential wherein the improvement is made by the independent function provided by a geared integral locking mechanism. This unique independent function allows in a vertical manner for the relative resistive axial motion of either of axial moving pinion shafts 60R and 60L to occur in an intermittent fashion as described below.

In viewing FIG. 2, we see that power is applied from pinion gear 22 unto ring gear 24 which is mounted upon differential casing 20. A maneuver is made which causes drive axle 30R to rotate faster than drive axle 30L. Bevel gear 40R is mounted on drive axle 30R. Bevel gear 40R will rotate and cause pinion gears 50R to rotate around pinion shaft 60R.

As illustrated in FIG. 2, pinion shaft 60R has opposing helixes cut into it 62R & 64R, and pinion gears 50R are mounted on pinion shaft 60R. Between pinion gears 50R, and split hubs 52, is placed driveable objects 56 within grooves 62R & 64R of pinion shaft 60R. This assembly is then held together by snap rings 54. The rotation of pinion gears 50R then causes driveable objects 56 to rotate within helixes 62R & 64R. This action then causes pinion shaft 60R to be propelled axially to an outward position. Pinion shaft 60R reaches maximum outward extension when driveable objects 56 fall into continuous groove 68. Axial movement of shaft 60R causes compression spring 84 to compress against retaining plate 86. This created compression allows driveable objects 56 to reengage from out of continuous groove 68.

Also illustrated in FIG. 2, we see pinion shaft 60R has gear teeth 66 cut into it, which are meshed with gear teeth 74 of gear cam lock 70R. When pinion shaft 60R is propelled axially, it then causes gear cam lock 70R to revolve within notch 76 of gear cam lock 70L. When this happens, drive axle 30R is allowed to freewheel, and drive axle 30L becomes locked in place with 100% power applied to axle 30L.

Figure 3:
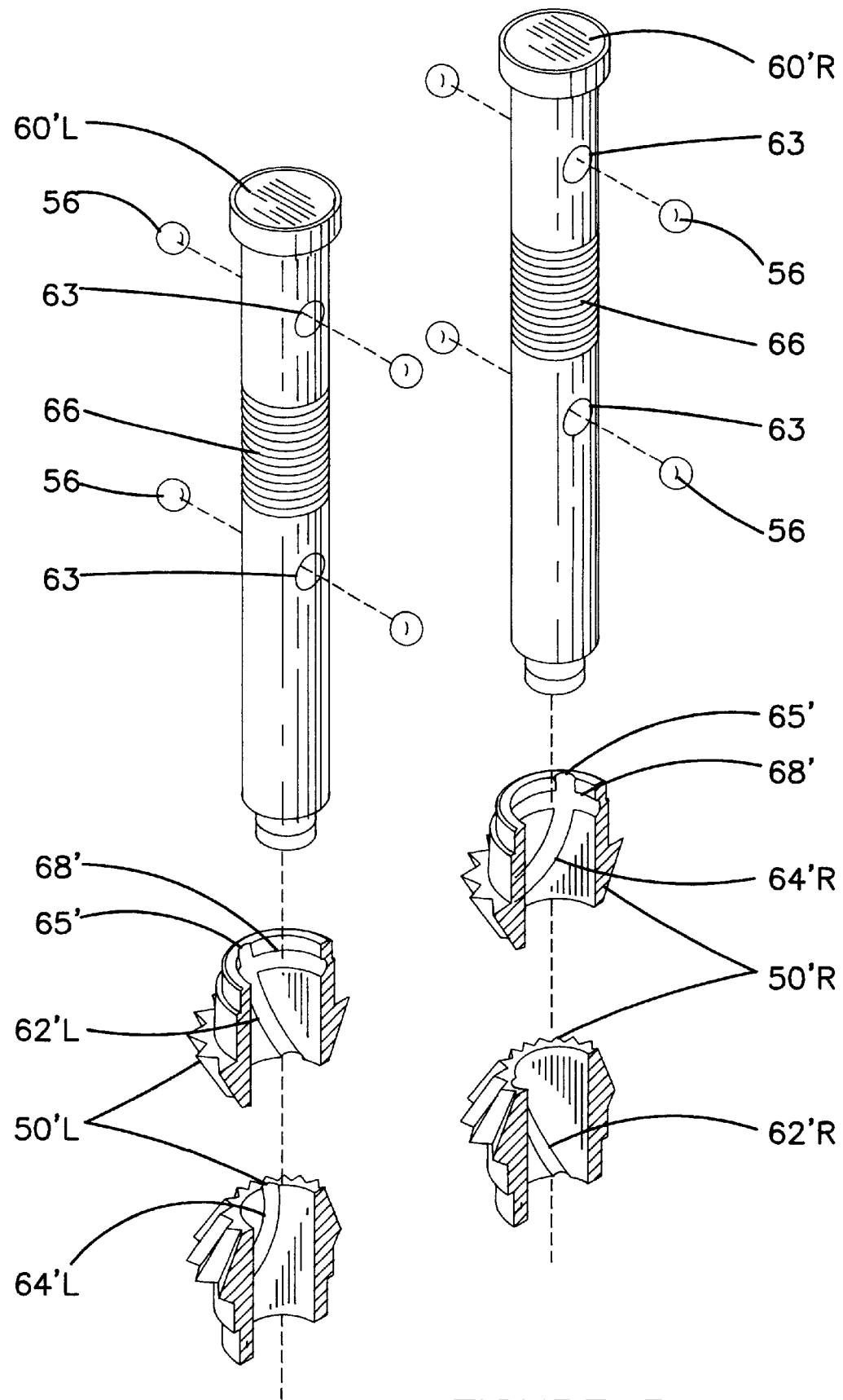
FIG. 3 is an exploded view of a portion of a second embodiment of geared cam locking differential system, made in accordance with the principles of the present invention.

In FIG. 3, we see pinion shafts 60'R and 60'L with gear teeth 66 cut into them. Either multiple holes or perforations 63 are machined in each shaft 60'R and 60'L. Within these holes 63 are placed multiple balls or elongated pins known as driveable objects 56. Driveable objects 56 must protrude from holes 63 as pinion gear sets 50'R and 50'L are placed on shafts 60'R and 60'L and over driveable objects 56.

Also shown in FIG. 3, are pinion gear sets 50'R and 50'L with two gears required per set. Within gears 50'R and 50'L are internally cut helical grooves shown as 62'R&L and 64'R&L. The numeral 62'indicates a right handed helix, and the numeral 64' indicates a left handed helix. The suffix R&L signifies either right or left side of unit. Please also note that it would be possible to place within the bottom gear of sets 50'R and 50'L a shortened helical groove so as prohibit shafts 60'R and 60'L from exiting gears 50'R and 50'L, (not shown).

Also shown are internally cut continuous grooves 68' and retaining grooves 65'. With retaining grooves 65' having a variation in cut from helical grooves 62'R&L and 64'R&L, a multipurpose is attained. First note that retaining grooves 65' will prohibit the axial propulsion of shafts 60'R and 60'L from going past continuous grooves 68'. Secondly retaining grooves 65' will provide a way to put gears 50'R and 50'L onto shafts 60'R and 60'L with driveable objects 56 in place.

Please note that continuous grooves 68' and retaining grooves 65' may be put in the top set of gears 50'R and 50'L, as shown in FIG. 3, or put in the bottom set of gears 50'R and 50'L (not shown). Please also note that continuous grooves 68' and retaining grooves 65' may be placed together in the same gear as shown in FIG. 3, or separate in different gears (not shown).

In FIG. 3, we see that driveable objects 56 fit into holes 63. Helical grooves 62'R&L and 64'R&L then propel each shaft 60'R or 60'L axially in an intermittent fashion as each set of gears 50'R or 50'L revolves. As either of shafts 60'R or 60'L is propelled axially, that particular shaft will become unlocked and freewheel as driveable objects 56 fall into continuous groove 68'.

Figure 4:
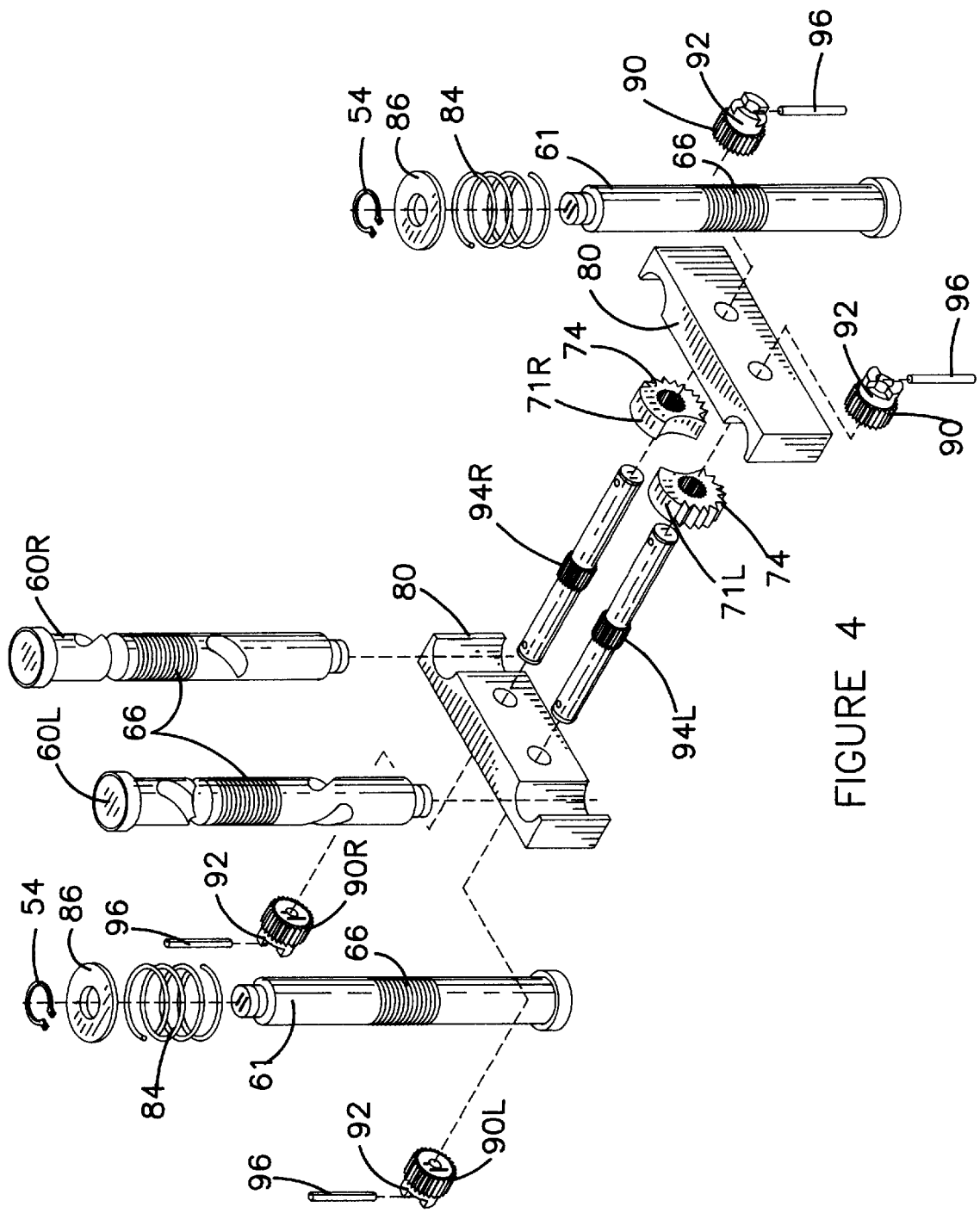
FIG. 4 is an exploded view of a counter-balancing system for the first and second embodiments of the geared cam locking differential system.

As illustrated in FIG. 4, gear cam locks 71R and 71L have internal splines or keyways cut in their bores. Locks 71R and 71L also have gear teeth 74 cut on their outer periphery which mesh with gear teeth 66 of lo pinion shafts 60R and 60L. Splined or keyed shafts 94R and 94L are placed through each lock 71R and 71L. A counterbalance gear 90 is placed on both ends of each shaft 94R and 94L. Each gear 90 has a notch 92 cut in its hub. Retaining pins 96 serve a multipurpose in that they hold gears 90 onto its respective shaft 94R and 94L, as well as cause gears 90 to revolve as either shaft 94R or 94L revolves. Placed between each set of gears 90 is a counterbalance pinion shaft 61. Each shaft 61 has gear teeth 66 cut in it so as to mesh with gears 90. Compression spring 84, retaining plate 86, and snap ring 54 is then placed on the end of each shaft 61. Split block 80 holds entire unit together.

As illustrated in FIG. 4, gear teeth 74 on gear cam locks 71R and 71L, mesh with gear teeth 66 of pinion shafts 60R and 60L. As either shaft 60R or 60L is propelled axially in an intermittent fashion, its respective lock 71R or 71L will revolve within the adjacent lock 71R or 71L. As either lock 71R or 71L revolves, its respective shaft 94R or 94L will also revolve. In this manner only one shaft 94R or 94L will revolve while the adjacent shaft remains stationary. A counterbalance gear 90 is placed on both ends of each shaft 94R and 94L. Placed between each set of gears 90 is a counterbalance pinion shaft 61. When either shaft 94R or 94L revolves, retaining pins 96 force gears 90 to revolve along with its respective shaft. This motion causes shafts 61 to be propelled axially in a simultaneous manner. The adjacent gears 90 which are mounted upon the stationary shaft 94R or 94L, will revolve upon their respective shaft because of a loose fit between the bores of gears 90 and shafts 94R and 94L.

Figure 5:
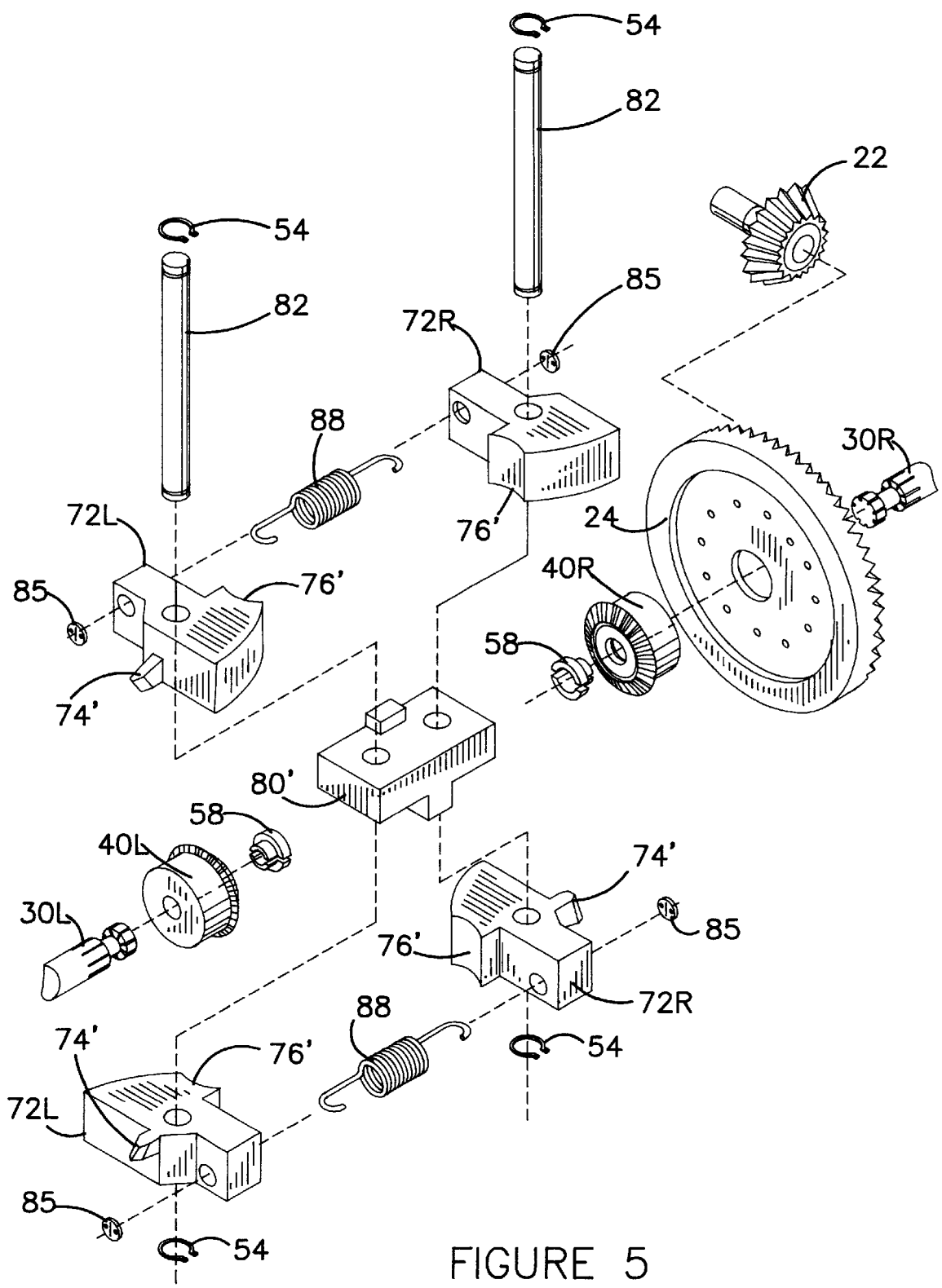
FIG. 5 is an exploded view of a third embodiment of a geared cam locking differential system, made in accordance with the principles of the present invention.

In a second aspect, my invention provides an improved automatic self-locking differential wherein the improvement is made by the independent function provided by a geared integral locking mechanism. As illustrated in FIG. 5, we see an exploded view of the entire device.

Power is supplied from pinion gear 22 which meshes with ring gear 24 which is mounted upon a differential casing (not shown). Drive axles 30R and 30L are mounted with bevel gears 40R and 40L which are held in place by C-clips 58. Gears 40R and 40L mesh with gear cam locks 72R and 72L. Locks 72R and 72L are mounted adjacent to one another so as to become a set with gear teeth 74' and notches 76' cut in them. Locks 72R and 72L sit atop solid block 80' and are held in place by retaining shafts 82 and snap rings 54. Tension springs 88 which may be either retaining type (shown) or compression type (not shown), and retaining clips 85 which may be either a clip (shown) or pin device (not shown) for use with a compression type spring, connect adjacent locks together.

During maneuvering a differential must be allowed to differentiate because of the varying wheel speeds. This describes the unique differentiating function of an automatic self-locking differential wherein the improvement is made by the independent function provided by a geared integral locking mechanism. This unique independent action occurs during maneuvering as described in the following manner.

In viewing FIG. 5, we see that gear teeth 74' of gear cam locks 72R and 72L mesh with bevel gears 40R and 40L. When a maneuver is made which causes either of drive axles 30R or 30L to rotate faster than its opposite axle, either of bevel gears 40R or 40L will rotate and cause either of locks 72R or 72L to revolve within notch 76' of the opposite lock. When this happens either of drive axles 30R or 30L is allowed to freewheel, and the opposite drive axle becomes locked in place with 100% power applied unto it.

My Invention Provides:

1. A differentiating system wherein rotational energy is transmitted to each axle in a simultaneous manner, whereby a means is provided to achieve an independent freewheeling action of either axle in an intermittent fashion by a combinational usage of;

driven bevel gears that are mounted on each axle;

wherein said bevel gears are mounted with multiple pinion gears;

wherein said pinion gears are mounted on multiple axial moving pinion shafts;

wherein each pinion shaft is interconnected to the adjacently mounted pinion shaft so as to become a set through a geared integral locking mechanism.

2. Axial moving pinion shafts;

with said shafts having gear teeth externally cut on said shafts periphery, so as to allow means for said shafts which are mounted adjacent to one another so as to become a set as they are interconnected to one another through a geared integral locking mechanism, thereby allowing a camming action as well as a locking action to be produced in a simultaneous manner;

wherein means is provided unto said shafts, so as to allow in a vertical manner for the relative resistive axial motion of each shaft in an intermittent fashion because of opposing sets of helically cut striated volutes cut on said shafts periphery with one set being cut right handed and the other set being cut left handed.

3. A geared integral locking mechanism comprising;

two concave shaped gear cam locks comprised within each set;

with each said set having multiple gear teeth cut on their periphery;

with each lock comprising said set being notched and mounted adjacent to the opposite lock within said set;

wherein means is provided by the combinational usage of two said gear cam locks comprised within each said set to allow to occur in a simultaneous fashion, said mechanism to produce a camming action as one said lock is allowed to revolve within the notch of the opposite said lock, as well as to produce a locking action to occur unto each axle as said mechanism interconnects two pinion shafts so that they become a set, whereby allowing to occur in a vertical manner the axial movement of each shaft in an intermittent fashion.

4. A differentiating system wherein rotational energy is transmitted to each axle in a simultaneous manner, whereby a means is provided to achieve an independent freewheeling action of either axle in an intermittent fashion by a geared integral locking mechanism comprising driven bevel gears that are mounted on each axle;

wherein said bevel gears are mounted with multiple gear cam locks;

wherein two concave shaped gear cam locks mounted adjacent to one another having multiple notches and gear teeth cut on their periphery comprises a set;

wherein means is provided by the combinational usage of two said gear cam locks comprised within each said set that allows to occur in a simultaneous fashion, said mechanism to produce a camming action as one said lock is allowed to revolve within the notch of the opposite said lock, as well as to produce a locking action to occur in an intermittent fashion unto each axle.

I claim:

1. A geared cam locking differential for transmitting rotational energy to each axle of a motorized vehicle, the differential comprising:

(a) a plurality of driven bevel gears mounted on each axle;

(b) a plurality of pinion gears which mesh with the bevel gears;

(c) a plurality of axially-movable pinion shafts on which the pinion gears are mounted, each of the shafts having a periphery; and (d) a pair of rotatable adjacent concave gear-cam locks, each lock having a periphery, a notch, and a plurality of gear teeth on the periphery of the lock, for locking the bevel gears and interconnecting the axles with one another, the locks being constructed and arranged for rotation of one of the locks in the notch of the other lock, whereby a camming action is produced as one of the gear-cam locks revolves within the notch of the other gear-cam lock, and an intermittent locking action is produced by the interconnection of the axles.

2. The geared cam locking differential of claim 1, further comprising:

(e) a plurality of gear teeth on the periphery of each pinion shaft for interconnecting adjacent pinion shafts, thereby providing simultaneous camming and locking actions.

3. The geared cam locking differential of claim 1, further comprising:

(e) opposing sets of helical striated volutes on the periphery of adjacent pinion shafts, the volutes of one set defining a right-handed helix and the volutes of the other set defining a left-handed helix, for interconnecting adjacent pinion shafts.

4. A geared cam locking differential for transmitting rotational energy to each axle of a motorized vehicle, the differential comprising:

(a) a plurality of driven bevel gears mounted on each axle;

(b) a plurality of pinion gears which mesh with the bevel gears;

(c) a plurality of axially-movable pinion shafts on which the pinion gears are mounted, each of the shafts having a periphery;

(d) a pair of rotatable adjacent concave gear-cam locks, each lock having a periphery, a notch, and a plurality of gear teeth on the periphery of the lock, for locking the bevel gears and interconnecting the axles with one another, the locks being constructed and arranged for rotation of one of the locks in the notch of the other lock; and (e) a plurality of gear teeth on the periphery of each pinion shaft for interconnecting adjacent pinion shafts, thereby providing simultaneous camming and locking actions;

whereby the camming action is produced as one of the gear-cam locks revolves within the notch of the other gear-cam lock, and the locking action is provided by the interconnection of the adjacent pinion shafts while permitting intermittent axial movement of each shaft.

5. A geared cam locking differential for transmitting rotational energy to each axle of a motorized vehicle, the differential comprising:

(a) a plurality of driven bevel gears mounted on each axle; and (b) a pair of rotatable adjacent concave gear-cam locks, each lock having a periphery, a notch and a plurality of gear teeth on the periphery of the lock, for locking the bevel gears and interconnecting the axles to one another, the locks being constructed and arranged for rotation of one of the locks in the notch of the other lock;

whereby a camming action is produced as one of the gear-cam locks revolves within the notch of the other gear-cam lock, and an intermittent locking action is produced by the interconnection of the axles.

6. In a geared cam locking differential for transmitting rotational energy to each axle of a motorized vehicle having a plurality of driven bevel gears mounted on each axle, the improvement comprising a pair of rotatable adjacent concave gear-cam locks, each lock having a periphery, a notch, and a plurality of gear teeth on the periphery of the lock, for locking the bevel gears and interconnecting the axles with one another, the locks being constructed and arranged for rotation of one of the locks in the notch of the other lock, whereby a camming action is produced as one of the gear-cam locks revolves within the notch of the other gear-cam lock, and an intermittent locking action is produced by the interconnection of the axles.

* * * * *